United States Patent Office 2,728,783
Patented Dec. 27, 1955

2,728,783

PROCESS OF PREPARING Δ⁹-3,20-DIKETO-17α-HYDROXY-21-ACETOXY-PREGNENE

Robert P. Graber, Elizabeth, and Norman L. Wendler, Summit, N. J., assignors to Merck & Co., Inc., Rahway, N. J., a corporation of New Jersey No Drawing. Application April 2, 1953,
Serial No. 346,532

3 Claims. (Cl. 260—397.45)

This invention is concerned generally with the preparation of cyclopentanopolyhydrophenanthrene compounds having an unsaturated linkage connecting the C-9 and C-11 carbon atoms. More particularly, it relates to a novel process for the preparation of $\Delta^{9(11)}$-17α-hydroxy-cyclopentanopolyhydrophenanthrene compounds such as $\Delta^{4,9(11)}$ - 3,20-diketo-17α-hydroxy-21-acetoxy-pregnadiene (also known as 11(9)-anhydro Compound F acetate) by reacting the corresponding 11,17α - dihydroxy-cyclopentanopolyhydrophenanthrene compound with a dehydrating agent. Our novel process is thus valuable for the preparation of 11(9)-anhydro Compound F acetate as well as other $\Delta^{9(11)}$-17α-hydroxy-cyclopentanopolyhydrophenanthene compounds valuable as intermediates in the preparation of said 11(9)-anhydro Compound F acetate which has been found to possess cortisone-like activity. The results obtained on the cotton pellet granuloma test have demonstrated that 11(9)-anhydro Compound F acetate possesses a high order of local tissue activity.

In accordance with this invention, an 11,17α-dihydroxy-cyclopentanopolyhydrophenanthrene compound (Compound 1 hereinbelow) is reacted with a dehydrating agent thereby forming the corresponding $\Delta^{9(11)}$-17α-hydroxy-cyclopentanopolyhydrophenanthrene compound (Compound 2). This reaction may be chemically represented, insofar as the changes taking place in rings B, C and D of the steroid nucleus are concerned, as follows:

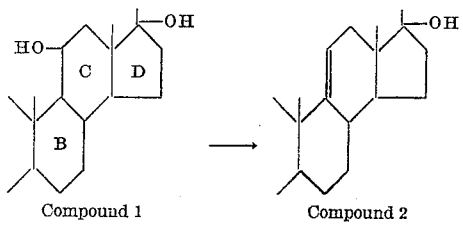

Compound 1        Compound 2

The 11,17α-dihydroxy-cyclopentanopolyhydrophenanthrene compounds which we ordinarily employ as starting materials in carrying out our process are the 11,17α-dihydroxy-pregnane compounds and $\Delta^4$-11,17α-dihydroxy-pregnene compounds, as for example, 11,17α-dihydroxy-pregnane, 11,17α-dihydroxy - 20 - keto-pregnane, 3,20-diketo-11,17α-dihydroxy-pregnane, 11,17α-dihydroxy-21-acyloxy-pregnane, 11,17α-dihydroxy-20-keto-21-acyloxy-pregnane, 3,20-diketo-11,17α-dihydroxy-21-acyloxy-pregnane, 3,20-diketo-11,17α-dihydroxy-21-acetoxy-pregnane, 3,20-diketo-11,17α - dihydroxy-21-propionoxy-pregnane, 3,20-diketo - 11,17α - dihydroxy-21-butyryloxy-pregnane, $\Delta^4$-11,17α-dihydroxy-pregnene, $\Delta^4$-11,17α-dihydroxy-20-keto-pregnene, $\Delta^4$-3,20-diketo-11,17α-dihydroxy-pregnene, $\Delta^4$-11,17α - dihydroxy - 21 - acyloxy-pregnene, $\Delta^4$-11,17α-dihydroxy-20-keto-21-acyloxy-pregnene, $\Delta^4$-3,20-diketo-11,17α-dihydroxy - 21 - acyloxy-pregnene, $\Delta^4$-3,20-diketo-11,17α-dihydroxy-21-acetoxy-pregnene, $\Delta^4$-3,20 - diketo - 11,17α-dihydroxy - 21 - propionoxy-pregnene, $\Delta^4$-3,20-diketo - 11,17α-dihydroxy-21-butyryloxy-pregnene, and the like. These 11,17α-dihydroxy-cyclopentanopolyhydrophenanthrene compounds, and in particular the 11,17α-dihydroxy-pregnane compounds and $\Delta^4$-11,17α-dihydroxy-pregnene compounds utilized as starting materials in our process can be prepared in accordance with procedures set forth in U. S. Patent 2,628,966 issued February 17, 1953, and in applicants' co-pending application Serial No. 198,916, filed December 2, 1950.

In carrying out the process of this invention, the 11,17α-dihydroxy - cyclopentanopolyhydrophenanthrene compound is reacted with a dehydrating agent as for example, phosphorus oxychloride, a hydrogen halide such as hydrogen chloride and hydrogen bromide, and the like. The dehydration reaction is conveniently conducted by bringing the 11,17α-dihydroxy-cyclopentanopolyhydrophenanthrene compound and the dehydrating agent together in acetonitrile or a substantially inert organic solvent, as for example a hydrocarbon solvent such as benzene, toluene, a halogenated hydrocarbon solvent such as chloroform, carbon tetrachloride, and the like. When the dehydration reaction is conducted utilizing phosphorus oxychloride as the dehydrating agent, the 11,17α-dihydroxy - cyclopentanopolyhydrophenanthrene compound and phosphorus oxychloride are brought together in contact with a proton-accepting organic compound as for example, a tertiary amine such as pyridine, quinoline, triethylamine, dimethylaniline, and the like. It is preferred to conduct the reaction by bringing the 11,17α-dihydroxy - cyclopentanopolyhydrophenanthrene compound, phosphorus oxychloride and proton-accepting organic compound together in a liquid medium comprising an inert organic solvent as for example, a hydrocarbon solvent such as benzene or toluene. The dehydration reaction is carried out at a temperature varying from below about 15° C. up to about 30° C.; the reaction time varies with the temperature from about twelve hours at 30° C. to approximately seventy-two hours at temperatures below 15° C. It is ordinarily preferred to conduct the reaction at a temperature of about 25° C. under which conditions the dehydration reaction is substantially complete after a period of twenty-four hours. The $\Delta^{9(11)}$-17α-hydroxy - cyclopentanopolyhydrophenanthrene compound produced in accordance with our procedure is conveniently recovered from the reaction mixture by evaporating most of the solvent, diluting the concentrated mixture with water, and extracting the steroid compound with a water-immiscible solvent such as benzene, toluene, chloroform, and the like. Residual tertiary amines present in the resulting organic solvent extract are conveniently removed by extracting with water and dilute aqueous acid solution. Upon evaporation of the organic solvent solution there is obtained the desired $\Delta^{9(11)}$-17α-hydroxy-cyclopentanopolyhydrophenanthrene compound which can be further purified, if desired, by recrystallization from organic solvents such as an alkyl alkanoate as for example, ethyl acetate, or mixtures of organic solvents such as dialkyl ketones-dialkyl ethers such as acetone-diethyl ether.

Where the dehydrating agent utilized is a hydrogen halide, the 11,17α-dihydroxy-cyclopentanopolyhydrophenanthrene compound and an excess of said hydrogen halide such as hydrogen chloride, hydrogen bromide, and the like, are ordinarily brought together in a liquid medium comprising a lower alkanoic acid as for example, acetic acid, propionic acid, and the like and/or an inert organic solvent as, for example, a hydrocarbon solvent such as benzene, a halogenated hydrocarbon solvent, such as chloroform, carbon tetrachloride, and the like. The resulting mixture is allowed to stand at a temperature below about 30° C., at which temperature the reaction is ordinarily complete after a reaction time of about twenty-four to forty-eight hours. The solvents are then evaporated from the reaction mixture, preferably under reduced pressure, and the $\Delta^{9(11)}$-cyclopentanopolyhydrophenanthrene compound isolated from the resulting concentrate in accordance with the procedure set forth hereinabove.

In accordance with our novel process, there are obtained $\Delta^{9(11)}$-17$\alpha$-hydroxy-cyclopentanopolyhydrophenanthrene compounds as for example, $\Delta^{9(11)}$-17$\alpha$-hydroxy-pregnene compounds and $\Delta^{4,9(11)}$-17$\alpha$-hydroxy-pregnadiene compounds such as $\Delta^{9(11)}$-17$\alpha$-hydroxy-pregnene, $\Delta^{9(11)}$-17$\alpha$-hydroxy-20-keto-pregnene, $\Delta^{9(11)}$-3,20-diketo-17$\alpha$-hydroxy-pregnene, $\Delta^{9(11)}$-17$\alpha$-hydroxy-21-acyloxy-pregnene, $\Delta^{9(11)}$-17$\alpha$-hydroxy-20-keto-21-acyloxy-pregnene, $\Delta^{9(11)}$-3,20-diketo-17$\alpha$-hydroxy-21-acyloxy-pregnene, $\Delta^{9(11)}$-3,20-diketo-17$\alpha$-hydroxy-21-acetoxy-pregnene, $\Delta^{9(11)}$-3,20-diketo-17$\alpha$-hydroxy-21-propionoxy-pregnene, $\Delta^{9(11)}$-3,20-diketo-17$\alpha$-hydroxy-21-butyryloxy-pregnene, $\Delta^{4,9(11)}$-17$\alpha$-hydroxy-pregnadiene, $\Delta^{4,9(11)}$-17$\alpha$-hydroxy-20-keto-pregnadiene, $\Delta^{4,9(11)}$-3,20-diketo-17$\alpha$-hydroxy-pregnadiene, $\Delta^{4,9(11)}$-17$\alpha$-hydroxy-21-acyloxy-pregnadiene, $\Delta^{4,9(11)}$-17$\alpha$-hydroxy-20-keto-21-acyloxy-pregnadiene, $\Delta^{4,9(11)}$-3,20-diketo-17$\alpha$-hydroxy-21-acyloxy-pregnadiene, $\Delta^{4,9(11)}$-3,20-diketo-17$\alpha$-hydroxy-21-acetoxy-pregnadiene, $\Delta^{4,9(11)}$-3,20-diketo-17$\alpha$-hydroxy-21-propionoxy-pregnadiene, $\Delta^{4,9(11)}$-3,20-diketo-17$\alpha$-hydroxy-21-butyryloxy-pregnadiene, and the like.

The $\Delta^{9(11)}$-17$\alpha$-hydroxy-cyclopentanopolyhydrophenanthrene compounds, and more particularly, the $\Delta^{9(11)}$-3-keto-17$\alpha$-hydroxy-pregnene compounds obtained in accordance with our process are conveniently converted to the corresponding $\Delta^{4,9(11)}$-3-keto-17$\alpha$-hydroxy-pregnadiene compounds by reacting the said $\Delta^{9(11)}$-3-keto-17$\alpha$-hydroxy-pregnadiene compounds with bromine in the presence of acetic acid to produce the corresponding $\Delta^{9(11)}$-4-bromo-3-keto-17$\alpha$-hydroxy-pregnene compound and reacting the latter compound with a dehydrohalogenating agent such as semicarbazide followed by pyruvic acid, thereby forming the corresponding $\Delta^{4,9(11)}$-3-keto-17$\alpha$-hydroxy-pregnadiene compound.

The following examples illustrate methods of carrying out the present invention, but it is to be understood that these examples are given for purposes of illustration and not of limitation.

*Example 1*

To a cooled solution of 1.22 g. of $\Delta^4$-3,20-diketo-11,17$\alpha$-dihydroxy-21-acetoxy-pregnene (Compound F acetate) in 10.0 ml. of dry pyridine was added 0.30 ml. of phosphorus oxychloride, and the mixture was allowed to stand at room temperature for a period of approximately fifteen hours. At the end of this time, the reddish-brown solution was evaporated in vacuo, while maintaining the temperature of the solution at about 25° C., to a volume of 4 to 5 ml. Thirty five milliliters of water was added slowly, with occasional swirling, to the concentrated solution, and the organic material which separated was extracted with ethyl acetate. The combined ethyl acetate extracts were washed with water, then with 1 normal aqueous hydrochloric acid solution until free of pyridine, again with water, then with a 5% aqueous sodium bicarbonate solution, again with water, and finally with a saturated aqueous solution of sodium chloride. The washed ethyl acetate solution was dried over anhydrous magnesium sulfate, and the solvent was evaporated in vacuo. The buff-colored, partly crystalline residual material was triturated with ether and the granular crystals thus obtained were recrystallized from a mixture of acetone and ether to give $\Delta^{4,9(11)}$-3,20-diketo-17$\alpha$-hydroxy-21-acetoxy-pregnadiene which was obtained in the form of micro-needles; M. P. 225–232° C.

*Example 2*

To a cooled solution of 1.22 g. of 3,20-diketo-11,17$\alpha$-dihydroxy-21-acetoxy-pregnane in 10.0 ml. of dry pyridine was added 0.50 ml. of phosphorus oxychloride, and the mixture was allowed to stand at room temperature for a period of approximately fifteen hours. At the end of this period, the reddish-brown solution was evaporated in vacuo, while maintaining the temperature of the solution at about 25° C., to a volume of 4 to 5 ml. Thirty-five milliliters of water was added slowly, with occasional swirling, to the concentrated solution, and the organic material which separated was extracted with ethyl acetate. The combined ethyl acetate extracts were washed with water, then with 1 normal aqueous hydrochloric acid solution until free of pyridine, again with water, then with a 5% aqueous sodium bicarbonate solution, again with water, and finally with a saturated aqueous solution of sodium chloride. The washed ethyl acetate solution was dried over anhydrous magnesium sulfate, and the solvent was evaporated in vacuo. The light-brown, crystalline residual material was recrystallized from a mixture of acetone and ether to give $\Delta^{9(11)}$-3,20-diketo-17$\alpha$-hydroxy-21-acetoxy-pregnene which was obtained in the form of small prisms; M. P. 202.5–206° C.

*Example 3*

Approximately 1 g. of 3,20-diketo-11$\beta$,17$\alpha$-dihydroxy-21-acetoxy-pregnane was dissolved in 50.0 ml. of glacial acetic acid containing 0.50 ml. of an 0.97 normal glacial acetic acid solution of hydrogen bromide, and the solution was allowed to stand at room temperature for a period of approximately forty-eight hours. At the end of this period, the acetic acid was evaporated in vacuo, while maintaining the temperature of the solution below about 30° C. The residual crystalline material was slurried with 50 ml. of water, and the organic material was extracted with three portions of ethyl acetate. The combined ethyl acetate extracts were washed once with water, twice with a 5% aqeous sodium bicarbonate solution, again with water, and finally with a saturated aqueous solution of sodium chloride. The washed ethyl acetate solution was dried, and the solvent was evaporated in vacuo. The pale-yellow, crystalline material thus obtained was recrystallized from ethyl acetate to give $\Delta^{9(11)}$-3,20-diketo-17$\alpha$-hydroxy-21-acetoxy-pregnene; M. P. 202–206.5° C.

The $\Delta^{9(11)}$-3,20-diketo-17$\alpha$-hydroxy-21-acetoxy-pregnene thus obtained can be converted to $\Delta^{4,9(11)}$-3,20-diketo-17$\alpha$-hydroxy-21-acetoxy-pregnadiene in accordance with the following experimental procedure: approximately 1 g. of $\Delta^{9(11)}$-3,20-diketo-17$\alpha$-hydroxy-21-acetoxy-pregnene was dissolved in 35 ml. of glacial acetic acid, and the solution was cooled, with stirring, to a temperature slightly above the freezing point. To this cold solution was added, dropwise, 27.5 ml. of a 0.10 molar solution of bromine in pure acetic acid, the rate of addition being such that no great excess of bromine was ever present; the addition required approximately fifty minutes. The resulting solution was poured into water and extracted three times with chloroform. The combined chloroform extracts were washed acid-free with aqueous sodium bicarbonate solution, then with water, and finally evaporated to small volume. The concentrated solution was diluted with ether whereupon a precipitate formed which was recovered by filtration and recrystallized from ethyl acetate to give substantially pure $\Delta^{9(11)}$-4-bromo-3,20-diketo-17$\alpha$-hydroxy-21-acetoxy-pregnene; M. P. 211.5–212° C. (dec.). Analysis: Calc'd for $C_{23}H_{31}O_5Br$: Br, 17.10. Found: Br, 16.97.

A solution containing 0.52 g. of $\Delta^{9(11)}$-4-bromo-3,20-diketo-17$\alpha$-hydroxy-21-acetoxy-pregnene in 15 ml. of glacial acetic acid was mixed with a solution containing 0.435 g. of semicarbazide hydrochloride, 0.50 g. anhydrous sodium acetate and 1 ml. of water in 35 ml. of acetic acid, and the mixture was heated under nitrogen for a period of about one hour at a temperature of approximately 90° C. A solution of 2 ml. of pyruvic acid and 0.60 g. of anhydrous sodium acetate in 3 ml. of water was then added and the resulting mixture was heated for a period of one hour at a temperature of approximately 90° C. under nitrogen. The reaction mixture was cooled, poured into excess water, and the aqueous mixture was extracted three times with chloroform. The combined chloroform extracts were washed with aqueous sodium bicarbonate solution, then with water, and finally evaporated to dryness. The residual material was recrystallized several times from a mixture of chloroform and ether to give substantially pure $\Delta^{4,9(11)}$-3,20-diketo-17$\alpha$-hydroxy-21-acetoxypregnadiene; M. P. 231.5–234.5° C. Analysis: Calc'd for $C_{23}H_{30}O_5$: C, 71.47; H, 7.83. Found: C, 71.26; H, 7.78.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting 3,20-diketo-11$\beta$,17$\alpha$-dihydroxy-21-acetoxy-pregnane with a dehydrating agent thereby forming $\Delta^{9(11)}$-3,20-diketo-17$\alpha$-hydroxy-21-acetoxy-pregnene.

2. The process which comprises reacting 3,20-diketo-11$\beta$,17$\alpha$-dihydroxy-21-acetoxy-pregnane with phosphorus oxychloride thereby forming $\Delta^{9(11)}$-3,20-diketo-17$\alpha$-hydroxy-21-acetoxy-pregnene.

3. The process which comprises reacting together, in acetic acid under substantially anhydrous conditions, hydrogen bromide and 3,20-diketo-11$\beta$,17$\alpha$-dihydroxy-21-acetoxypregnane, thereby forming $\Delta^{9(11)}$-3,20-diketo-17$\alpha$ hydroxy-21-acetoxy-pregnene.

References Cited in the file of this patent

UNITED STATES PATENTS 2,409,798   Reichstein _____ Oct. 22, 1946